(12) United States Patent
Henderson

(10) Patent No.: US 10,801,373 B2
(45) Date of Patent: Oct. 13, 2020

(54) LEAD SCREW ACTUATOR DEVICES AND METHODS THEREOF

(71) Applicant: New Scale Technologies, Inc., Victor, NY (US)

(72) Inventor: David A. Henderson, Farmington, NY (US)

(73) Assignee: NEW SCALE TECHNOLOGIES, INC., Rochester, NY (US)

( * ) Notice: Subject to any disclaimer, the term of this patent is extended or adjusted under 35 U.S.C. 154(b) by 807 days.

(21) Appl. No.: 15/428,654

(22) Filed: Feb. 9, 2017

(65) Prior Publication Data

US 2017/0229981 A1    Aug. 10, 2017

Related U.S. Application Data

(60) Provisional application No. 62/293,158, filed on Feb. 9, 2016.

(51) Int. Cl.
*F01L 1/22* (2006.01)
*H02N 2/00* (2006.01)
*H02N 2/10* (2006.01)

(52) U.S. Cl.
CPC .............. *F01L 1/22* (2013.01); *H02N 2/0025* (2013.01); *H02N 2/0095* (2013.01); *H02N 2/101* (2013.01)

(58) Field of Classification Search
CPC .......................... H02N 2/0025; H02N 2/0095
See application file for complete search history.

(56) References Cited

U.S. PATENT DOCUMENTS 7,309,943 B2 * 12/2007 Henderson ............. G02B 7/102
                                                        310/323.02
10,316,709 B2 * 6/2019 Zurface ..................... F01L 1/22

* cited by examiner

*Primary Examiner* — Thomas M Dougherty
*Assistant Examiner* — Karen B Addison
(74) *Attorney, Agent, or Firm* — Troutman Pepper Hamilton Sanders LLP (Rochester)

(57) ABSTRACT

A lead screw actuator device includes a base configured to support a plurality of actuators. A first bridge is supported by one of the plurality of actuators and a second bridge is supported by another one of the plurality of actuators. A nut is supported by the first bridge and the second bridge and is rotatably coupled to a screw with a sliding contact friction between the screw and the nut. The plurality of actuators generate small movements of the first bridge, the second bridge, and the nut that produce relative rotation between the nut and the screw. A method of making a lead screw actuator device is also disclosed.

18 Claims, 7 Drawing Sheets

LEAD SCREW ACTUATOR DEVICES AND METHODS THEREOF

This application claims the benefit of U.S. Provisional Patent Application Ser. No. 62/293,158, filed Feb. 9, 2016, which is hereby incorporated by reference in its entirety.

FIELD

This technology relates to generally to actuator devices and methods thereof and, more particularly, to a lead screw actuator device that provides precise movements with a very high holding force and stiffness.

BACKGROUND

Actuator devices are required in many applications. The actuator devices need to be tailored for the particular application, including any environmental factors that may impact the actuator device. By way of example, an actuator device may be utilized as a lash adjuster for valve trains in an internal combustion engine. In such an application, the actuators must operate over a very wide range of force in an oil mist environment. Thus, the actuator device must be designed to meet the performance requirements of the specific application.

SUMMARY

A lead screw actuator device includes a base configured to support a plurality of actuators. A first bridge is supported by one of the plurality of actuators and a second bridge is supported by another one of the plurality of actuators. A nut is supported by the first bridge and the second bridge and is rotatably coupled to a screw with a sliding contact friction between the screw and the nut. The plurality of actuators generate small movements of the first bridge, the second bridge, and the nut that produce relative rotation between the nut and the screw.

A method for making a lead screw actuator device includes providing a base configured to support a plurality of actuators. A first bridge supported by one of the plurality of actuators and a second bridge supported by another one of the plurality of actuators are provided. A nut supported by the first bridge and the second bridge is rotatably coupled to a screw with a sliding contact friction between the screw and the nut. The plurality of actuators generate small movements of the first bridge, the second bridge, and the nut that produce relative rotation between the nut and the screw.

Examples of this technology provide a lead screw actuator device that advantageously provides a high force density, high torque, and a high holding force and stiffness. This exemplary technology provides precise movements with very high holding force and stiffness. This technology provides an actuator that that automatically makes small and fast adjustments in dynamic mechanisms where the dynamic force required to move is much less than the required static holding force, and also provides a range of movement of several millimeters in a volume of only a few cubic centimeters.

DETAILED DESCRIPTION

Figure 1:
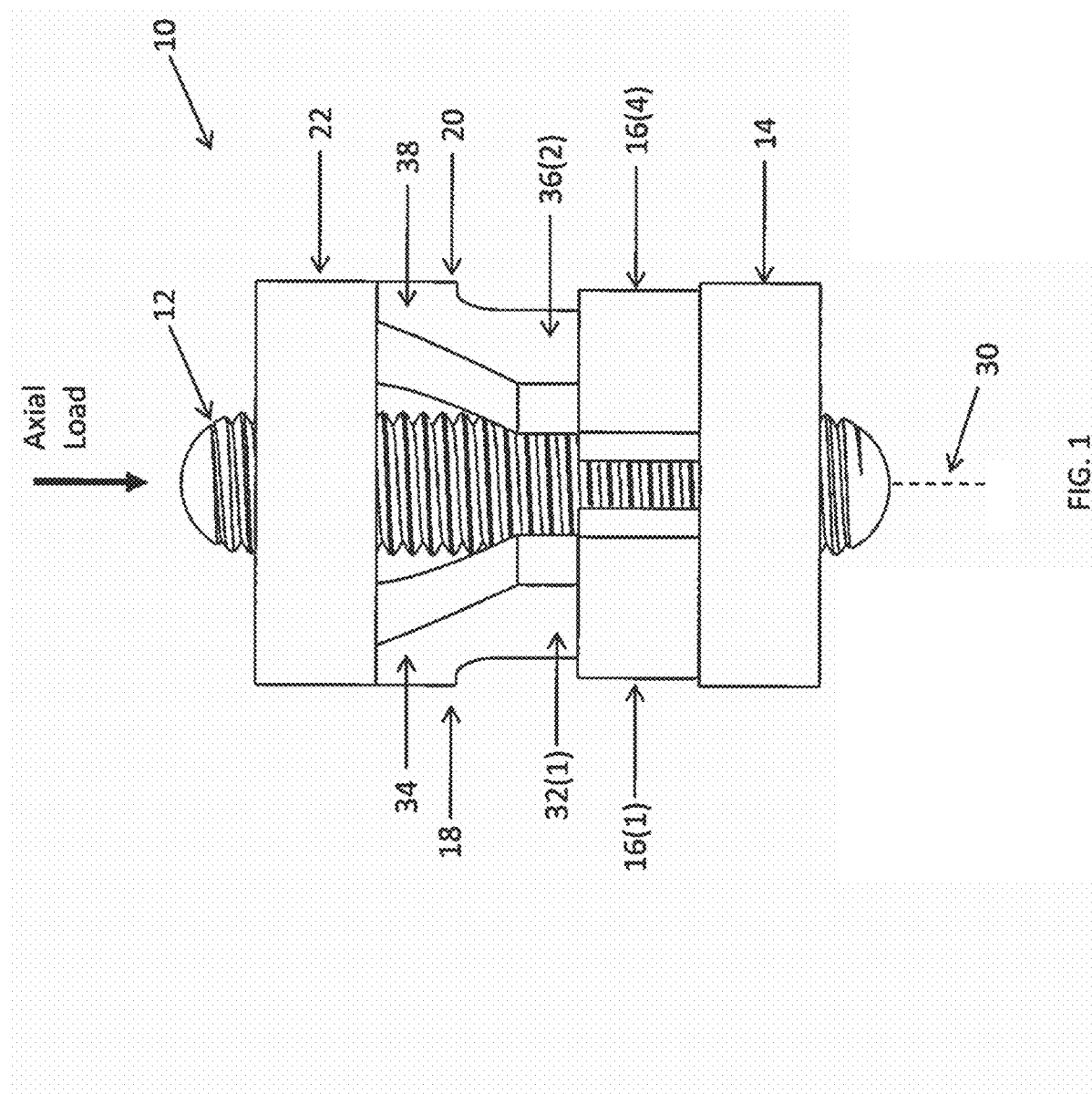
FIG. 1 is a side view of an exemplary lead screw actuator device of the present technology.
Figure 2:
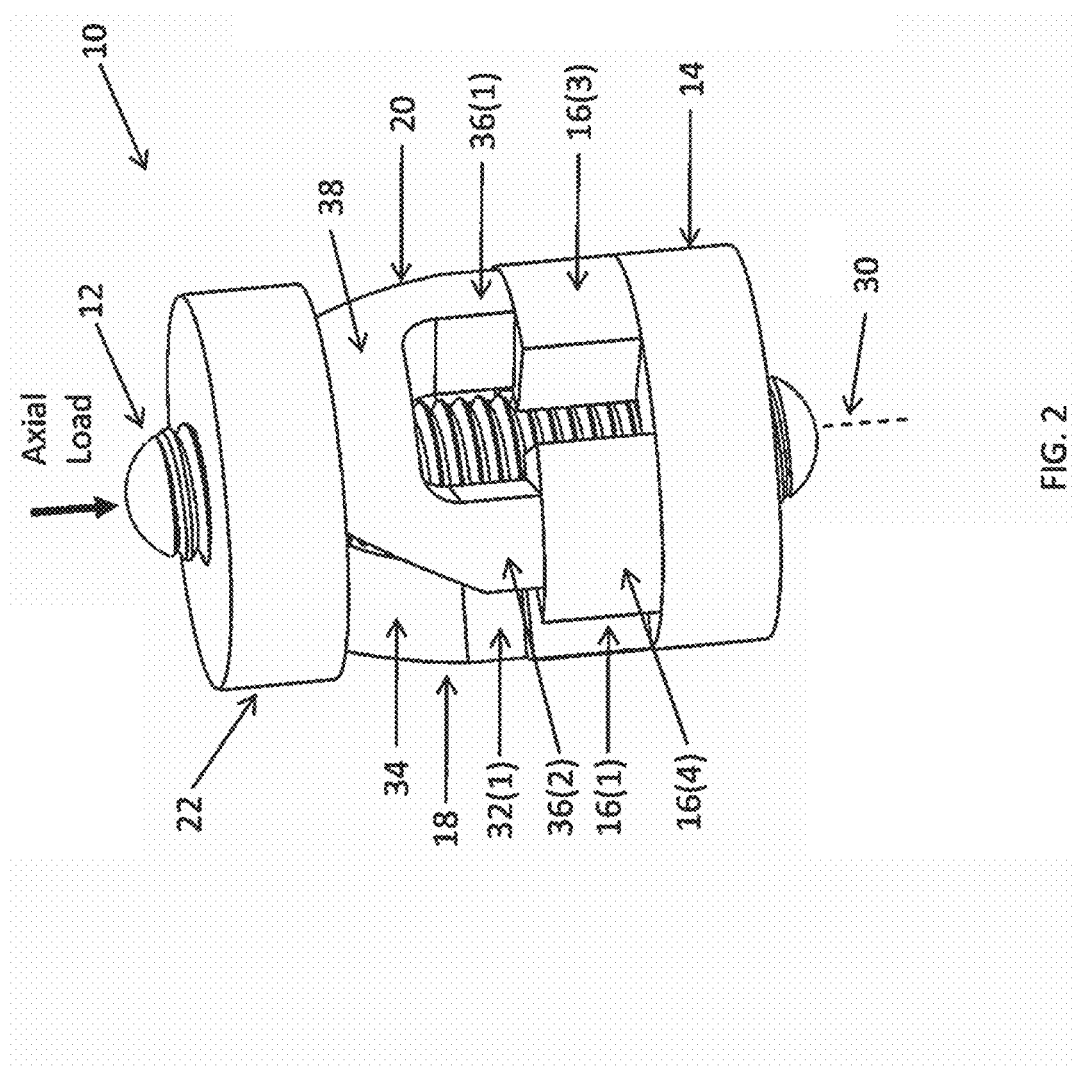
FIG. 2 is a side perspective view of the exemplary lead screw actuator device.
Figure 3:
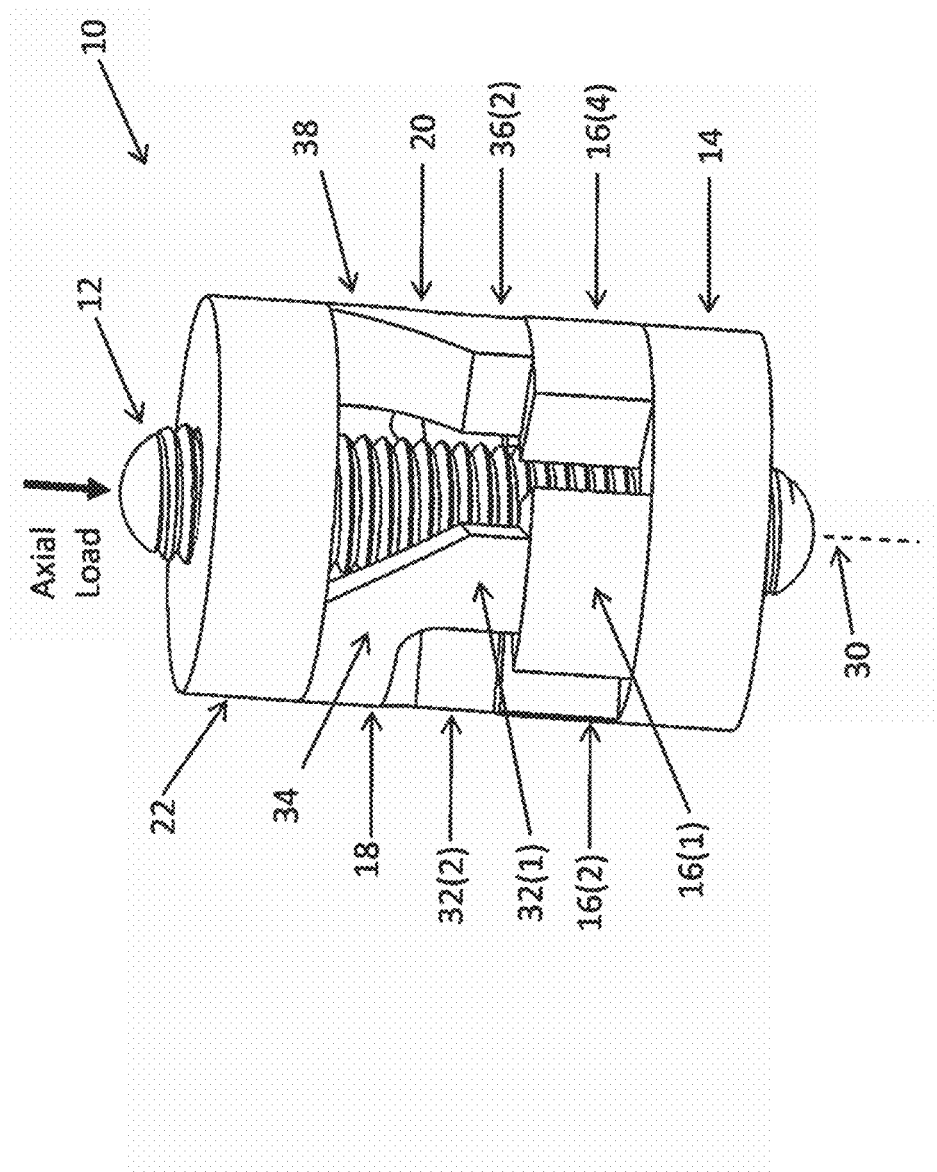
FIG. 3 is a another side perspective view of the exemplary lead screw actuator device.

An exemplary lead screw actuator device 10 is illustrated in FIGS. 1-7. The lead screw actuator device 10 includes a screw 12, a base 14, a plurality of piezoelectric stacks 16(1)-16(4), a first bridge 18, a second bridge 20, a nut 22, a drive and control circuit 24, an optional charge sensing circuit 26, an optional energy harvesting and storage circuit 27, and an optional electric switch 28, although the lead screw actuator may include other types and numbers of elements, devices, or components in other configurations. This technology provides a more efficient actuator device that may advantageously be utilized in a number of applications, such as a lash adjuster for valve trains in internal combustion engines by way of example only.

The screw 12 is an elongated cylindrical threaded screw having a central axis 30, although other types of screws with other configurations may be used. In this example, the screw 12 is threaded along the outer surface located inside the nut 22, although the screw may have other features to provide for interaction with the base 14 and the nut 22. The screw 12, in combination with the nut 22, provides a high holding force and stiffness for the lead screw actuator device 10 and may be constructed of any suitable materials to provide the necessary stiffness.

In this example, the base 14 is a disc shaped base that extends around the central axis 30 of the screw 12, with a clearance hole for the screw 12, although the base 14 may have other configurations. The base 14 is configured to support the plurality of piezoelectric stacks 16(1)-16(4) on a surface thereof, although the base 14 may support other elements and/or components at other locations.

In this example, four piezoelectric stacks 16(1)-16(4) are positioned on base 14 to serve as actuators for the lead screw actuator device 10, although other numbers and/or types of actuators constructed of different types and/or numbers of materials may be utilized. In this example, the piezoelectric stacks 16(1) and 16(2) support and drive the first bridge 18 and are located approximately 90 degrees apart from one another about the central axis 30 of the screw 12, although other numbers of the piezoelectric stacks and/or other actuators at other positions could be used. Additionally, in this example the piezoelectric stacks 16(3) and 16(4) support and drive the second bridge 20 and are located approximately 90 degrees apart from one another about the central axis 30 of the screw 12, although other numbers of the piezoelectric stacks and/or other actuators at other positions could be used. The piezoelectric stacks 16(1) and 16(3) are positioned approximately 180 degrees apart from one another, while piezoelectric stacks 16(2) and 16(4) are positioned approximately 180 degrees apart from one another, although other positions and locations of the piezoelectric stacks could be used. In one example, the piezoelectric stacks 16(1)-16(4) are formed of a plurality of separate stacks of piezoelectric material as described more fully below.

The first bridge 18 includes a first base 32(1) and a second base 32(2) that are supported by the piezoelectric stacks 16(1) and 16(2), respectively, and an upper bridge portion 34 that contacts the nut 22, although the first bridge 18 may have other configurations. The first bridge 18 is configured to transfer axial movement of the piezoelectric stacks 16(1) and 16(2) to the nut 22 and may be constructed of any suitable material.

The second bridge 20 includes a first base 36(1) and a second base 36(2) that are supported by the piezoelectric stacks 16(3) and 16(4), respectively, and an upper bridge portion 38 that contacts the nut 22, although the second bridge 20 may have other configurations. The second bridge 20 is configured to transfer axial movement of the piezoelectric stacks 16(3) and 16(4) to the nut 22 and may be constructed of any suitable material. Although the first bridge 18 and the second bridge 20 are described, other types and/or numbers of bridges in other combinations can be utilized to transfer axial movement of the piezoelectric stacks 16(1)-16(4) to the nut 22.

The nut 22 is supported by the first bridge 18 and the second bridge 20, which are located approximately 180 degrees apart from one another about the central axis 30 of the screw 12. The nut 22 is threaded on its inner surface to interact with the threads of the screw 12 generating a contact sliding friction, although the nut 22 may interact with the screw 12 in other manners. The nut 22 is rotatably coupled on the screw 12 and when engaged on the screw 12 provides an axial load in the direction along the central axis 30 of the screw 12 against the piezoelectric stacks 16(1)-16(4) through the first bridge 18 and the second bridge 20. In this example, the nut 22 is disc shaped and extends about the central axis 30 of the screw 12, although the nut may have other configurations.

Figure 4:
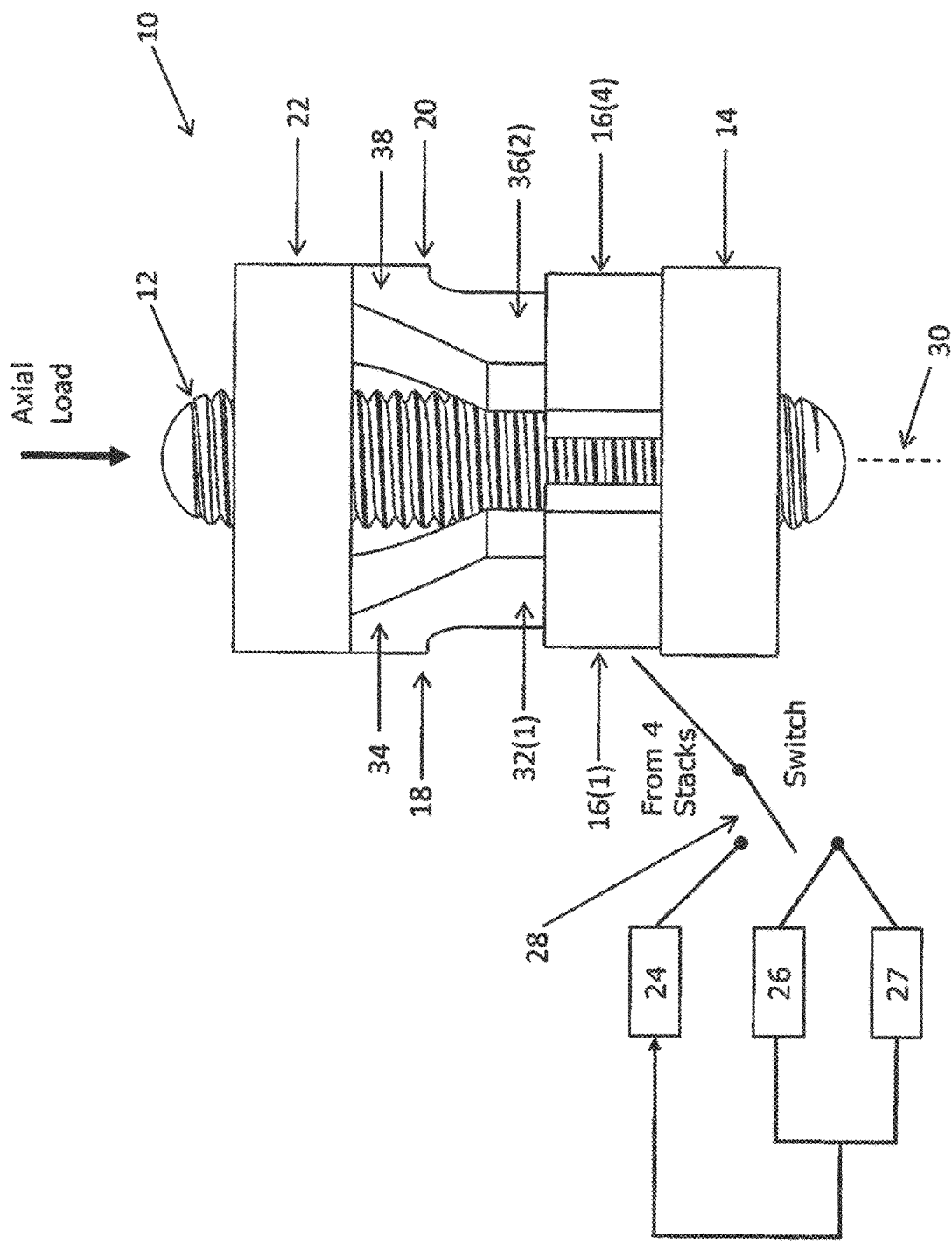
FIG. 4 is a partial side view and partial block diagram of the exemplary lead screw actuator device coupled to a driving circuit, a charge measurement circuit, and/or an energy harvesting and storage circuit through an electric switch.

Referring now more specifically to FIG. 4, the piezoelectric stacks 16(1)-16(4) are coupled to the drive and control circuit 24, which may provide one or more driving voltage waveforms to the piezoelectric stacks 16(1)-16(4) to generate movement of the piezoelectric stacks 16(1)-16(4), although other manners for controlling the movement of the piezoelectric stacks 16(1)-16(4) can be used. By way of example, the piezoelectric stacks 16(1)-16(4) may be coupled to the drive and control circuit 24 by a flexible printed circuit board.

In this example, the drive and control circuit 24 is coupled to the piezoelectric stacks 16(1)-16(4) such that the piezoelectric stacks 16(1) and 16(3), which are spaced approximately 180 degrees apart, may be selectively energized to produce forward movement of the nut 22 about the screw 12, and the piezoelectric stacks 16(2) and 16(4), which are spaced approximately 180 degrees apart, may be selectively energized to produce reverse movement of the nut 22 about the screw 12.

In this example, the piezoelectric stacks 16(1)-16(4) are coupled to the drive and control circuit 24 through the electric switch 28, although the drive and control circuit 24 may be coupled in other manners, such as directly to the piezoelectric stacks 16(1)-16(4) by way of example only.

Figure 5:
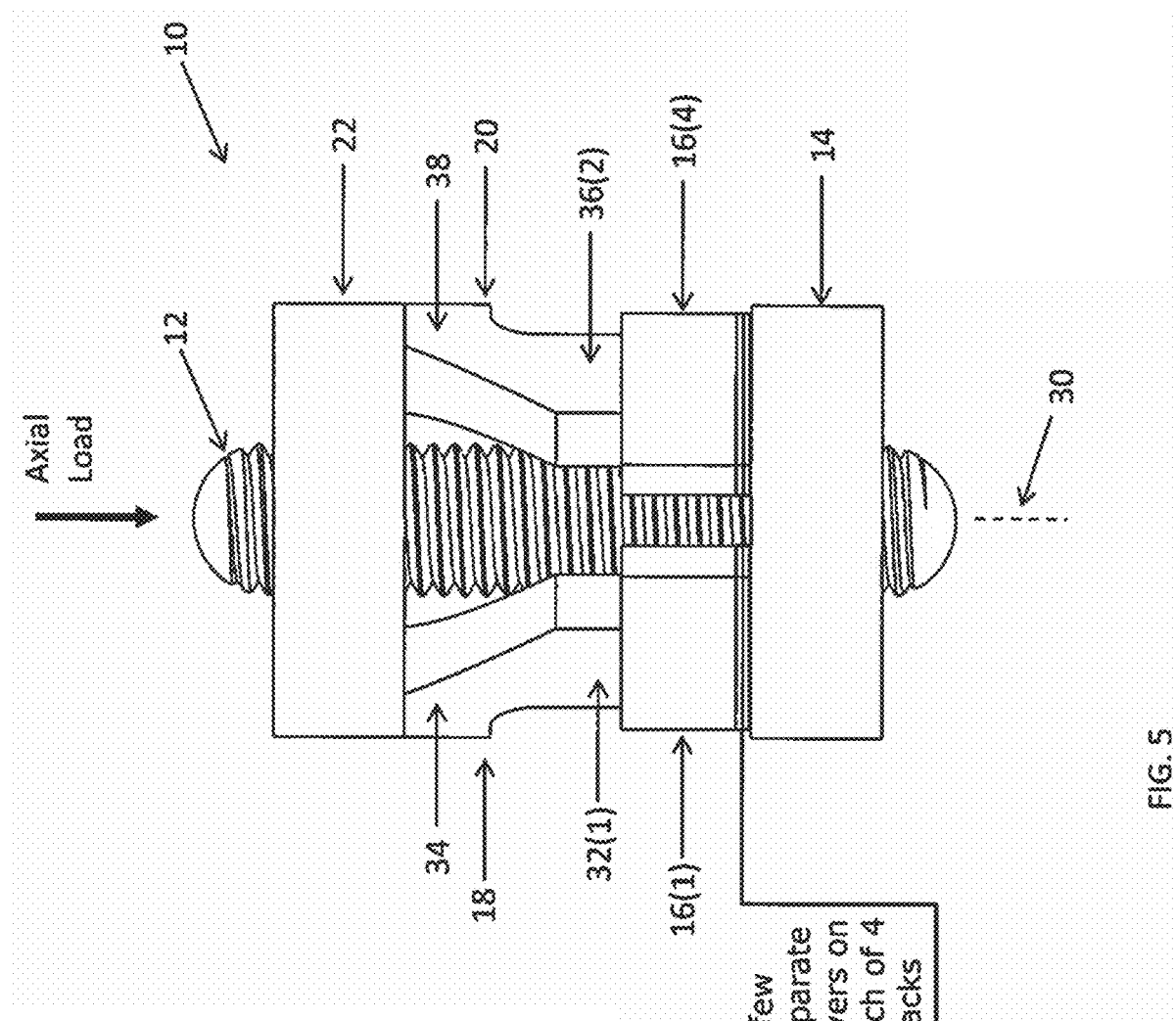
FIG. 5 is a partial side view and partial block diagram of the exemplary lead screw actuator device coupled separately to the charge measurement circuit through separate layers of the piezoelectric stacks of the actuators.

In this example, the piezoelectric stacks 16(1)-16(4) are also coupled to the optional charge measurement circuit 26 through the electric switch 28, although in another example, as illustrated in FIG. 5, the charge measurement circuit 26 may be coupled directly to separate layers of the piezoelectric stacks 16(1)-16(4) from the drive and control circuit 24. Referring again to FIG. 4, the charge measurement circuit 26 is configured to measure a change in charge created by the piezoelectric stacks 16(1)-16(4) in response to changes in the axial load on of the nut 22. The change in charge may be utilized to determine an external force on the lead screw actuator device 10.

In FIG. 4, the piezoelectric stacks 16(1)-16(4) are also coupled to the optional energy harvesting and storage circuit 27. The energy harvesting and storage circuit 27 may work independently from, or in conjunction with, the charge measurement circuit 26. In this example, the force applied to the lead screw actuator device 10 is cyclical. During the point of lowest force, the piezoelectric stacks 16(1)-16(4) are coupled to the drive and control circuit 24 by the optional electrical switch 28 and the position of the screw 12 is changed. During the point of highest force, the piezoelectric stacks 16(1)-16(4) are coupled to the energy harvesting and storage circuit 27 and the optional charge measurement circuit 26 by the electrical switch 28 such that the energy stored from each force cycle can be used to provide power to the drive and control circuit 24 and create a substantially self-powered lead screw actuator device 10 based on energy generated from external forces applied to the lead screw actuator device 10.

In FIG. 4, the optional electric switch 28 allows for an alternating connection between the drive and control circuit 24 and the charge measurement circuit 26 and the piezoelectric stacks 16(1)-16(4). In this example, using the alternating connection of the optional electric switch 28 allows the same layers in the four piezoelectric stacks 16(1)-16(4) to be used for both actuation and sensing. The electric switch 28 is configured to be selectable to engage the lead screw actuator device 10 in a driving/actuation mode or a charge sensing mode to determine force. In the driving mode, the electric switch 28 provides a communication path between the drive and control circuit 24 and the piezoelectric stacks 16(1)-16(4) and electrically closes the path between the charge measurement circuit 26 and the piezoelectric stacks 16(1)-16(4). In the actuation mode, the electric switch 28 provides an open communication path between the charge measurement circuit 26 and the piezoelectric stacks 16(1)-16(4) and electrically closes the path between the drive and control circuit 24 and the piezoelectric stacks 16(1)-16(4).

An exemplary operation of the lead screw actuator of the present technology will now be described with reference to FIGS. 1-7.

Figure 6:
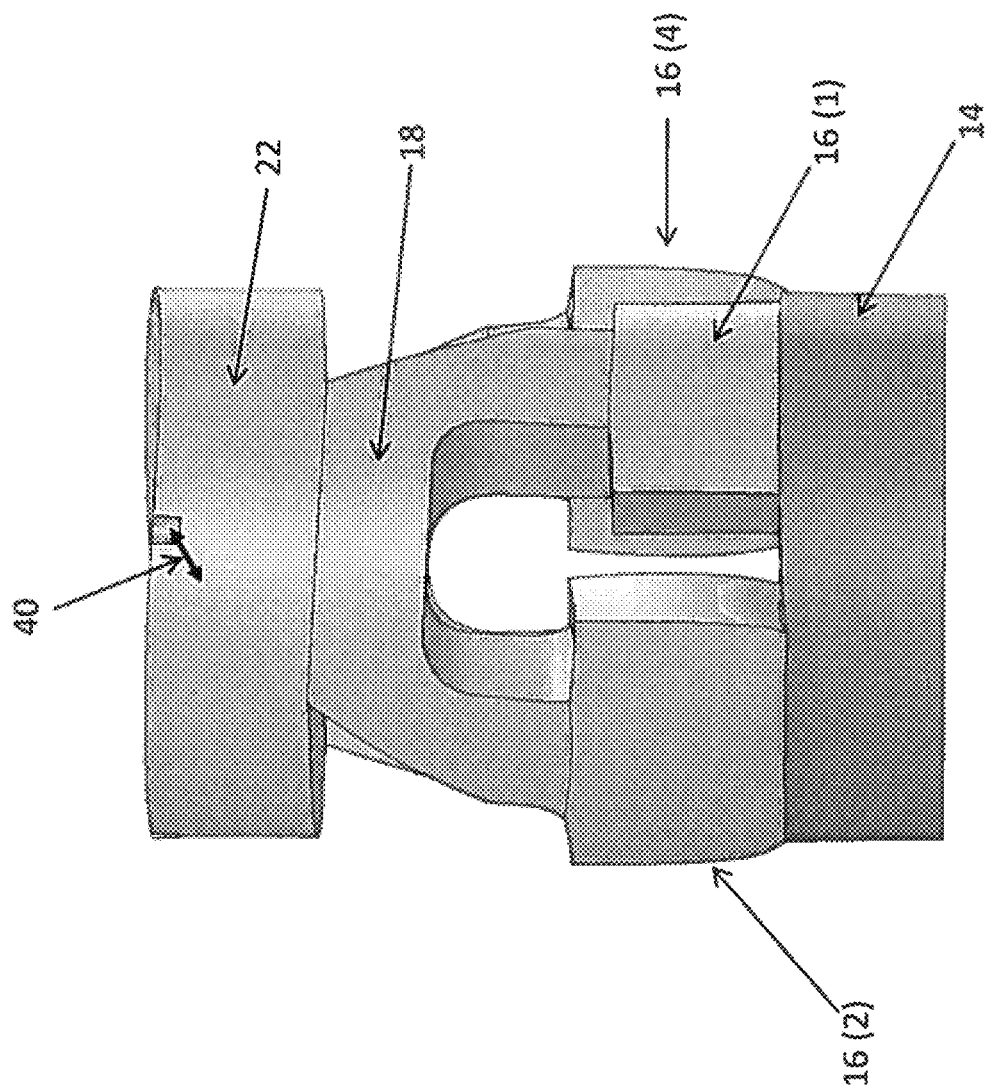
FIG. 6 is a side view of the exemplary lead screw actuator device during an exemplary actuation.

In one example, the lead screw actuator device 10 may be used in a driving or actuation mode to drive motion of the screw 12. The drive and control circuit 24 may selectively provide one or more voltage waveforms to one or more of the piezoelectric stacks 16(1)-16(4) to drive motion of the nut 22. In this example, the waveforms provided to the piezoelectric stacks 16(1)-16(4) from the drive and control circuit 24 are repeating pulse waveforms having a faster portion and a slower portion, although other types and/or numbers of waveforms or other signals could be used. In this particular example, the piezoelectric stacks 16(1) and 16(3) when energized produce forward movement of the nut 22 of the lead screw actuator device 10 and the piezoelectric stacks 16(2) and 16(4) when energized produce reverse movement of the nut 22 of the lead screw actuator device 10, although other arrangements could be used. In this example, the piezoelectric stacks 16(2) and 16(4) are energized by the drive and control circuit 24. The piezoelectric stacks 16(2) and 16(4) use the $d_{33}$ strain applied thereto to expand along the axial direction and lift second base 32(2) of the first bridge 18 and second base 36(2) of the second bridge 20. The first bridge 18 and the second bridge 20 convert the axial movement to a combined axial and torsional movement of the nut 22 as shown by the arrow in FIG. 6. The arrow 40 in FIG. 6 illustrates the general movement of the nut 22 above the first bridge 18 produced by the first bridge 18. While the movement produced by the second bridge 20 is not illustrated, such movement provides the same axial and torsional components as the first bridge 18, but rotated 180 degrees.

Figure 7:
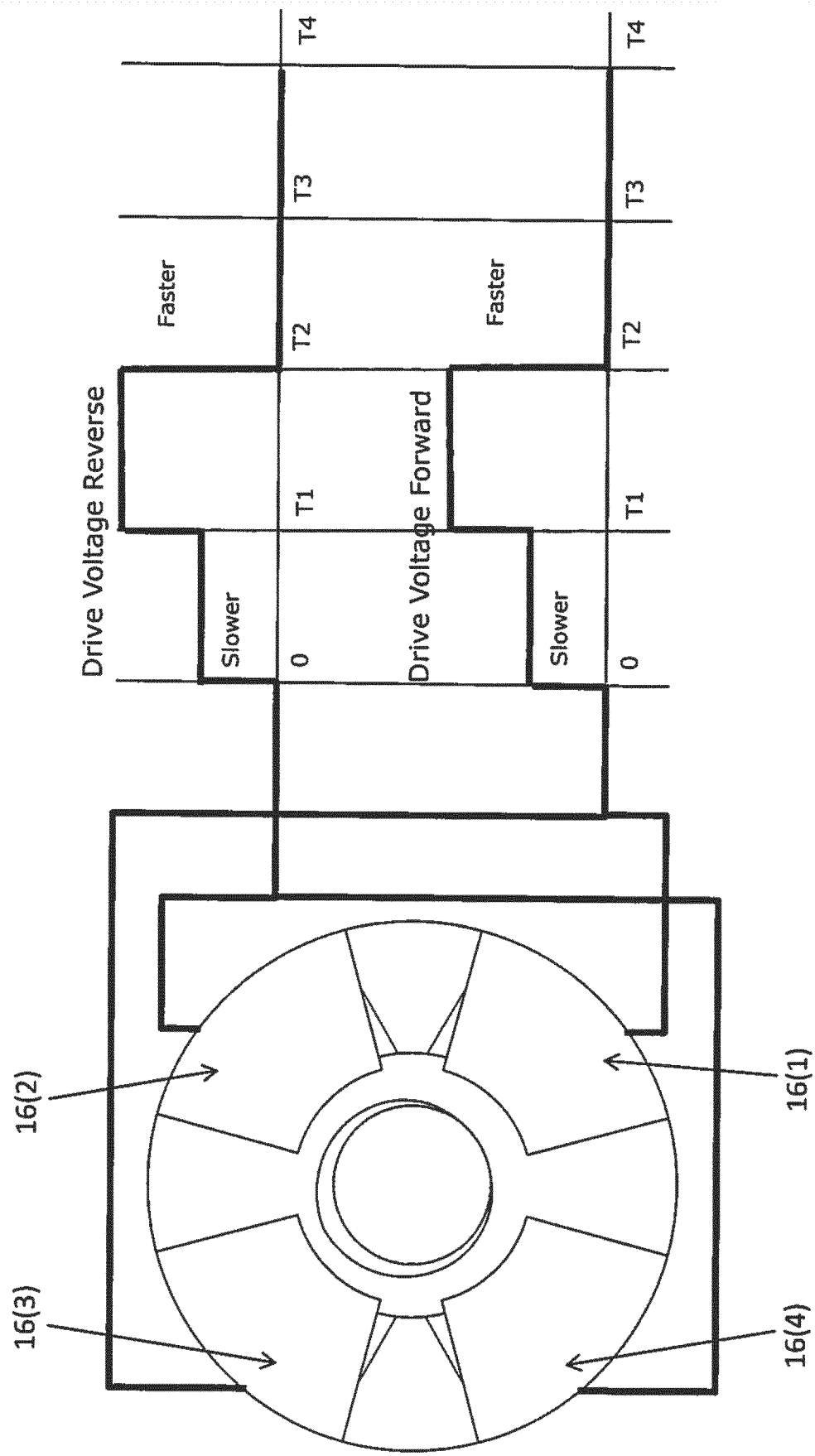
FIG. 7 is a bottom view of the exemplary lead screw actuator device and a waveform diagram illustrating a sample activation of the device.

Referring now to FIG. 7, from 0 to T2 the waveform has a slower portion that moves at a lower velocity where the threads in the nut 22 and the screw 12 stick and the screw 12 rotates in the desired direction. From T2 to T4 the waveform has a faster portion that moves at a sufficient velocity to cause relative "slip" between the nut 22 and the screw 12, which creates a net rotation of the screw 12 for each waveform cycle. The amplitude of the rotation of the screw 12 per cycle increases with the amplitude of the driving waveform. The speed of the rotation of the screw 12 increases with increases in the waveform frequency and an increase in the waveform amplitude.

In another example, the lead screw actuator device 10 may act in a charge sensing mode to determine a force acting on the lead screw actuator device 10. The force sensing is achieved using the piezoelectric characteristics of the piezoelectric stacks 16(1)-16(4). In this example, the axial load from the nut 22 is directly supported by the four piezoelectric stacks 16(1)-16(4). The change in force of the axial load is substantially proportional to the change in charge measured on the four piezoelectric stacks 16(1)-16(4). Methods for measuring the change in charge on piezoelectric capacitors are well known to those of ordinary skill in the art.

In yet another example, the lead screw actuator device 10 may act in an energy harvesting and storage mode that provides power for the drive and control circuit 24 or other uses. Energy harvesting and storage is achieved using the piezoelectric characteristics of the piezoelectric stacks 16(1)-16(4). In this example, the axial load from the nut 22 is directly supported by the four piezoelectric stacks 16(1)-16(4). The change in force of the axial load is substantially proportional to the charge generated in the four piezoelectric stacks 16(1)-16(4). At substantially peak force and charge, the energy harvesting and storage circuit 27 transfers the piezoelectric charge to a separate capacitor, although other energy storage devices such as a battery may be utilized. Methods for harvesting charge from piezoelectric capacitors are well known in the art.

In a further example, the lead screw actuator device 10 may be utilized as a lash adjuster for valve trains in an internal combustion engine, although the device 10 can be used for other types of applications. In this example, the force acting on the lead screw actuator device 10 changes by two orders of magnitude through the engine cycle. The lead screw actuator device 10 moves when the load is at its minimum point, but must also hold position when the force is at its maximum point. In addition to operating over a very large force range, the lead screw actuator device 10 of the present technology will ideally operate in an oil mist environment and have internal force sensing to sense the optimum position for valve train operation and synchronize the actuator movement to the point of minimum force in the engine cycle and also the point of maximum force for energy harvesting.

Accordingly, this technology, as illustrated and described above with the example herein, provides a more efficient actuator device that may advantageously be utilized in a number of applications, such as a lash adjuster for valve trains in internal combustion engines by way of example only.

Having thus described the basic concept of the invention, it will be apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A lead screw actuator device comprises:
   a base configured to support a plurality of actuators;
   a first bridge supported by one of the plurality of actuators and a second bridge supported by another one of the plurality of actuators; and
   a nut supported by the first bridge and the second bridge and rotatably coupled to a screw with a sliding contact friction between the screw and the nut, wherein the plurality of actuators are configured to generate small movements of the first bridge, the second bridge, and the nut that produce relative rotation between the nut and the screw.

2. The lead screw actuator device as set forth in claim 1, wherein each of the plurality of actuators comprise piezoelectric stacks.

3. The lead screw actuator device as set forth in claim 1, wherein the first bridge and the second bridge are positioned about 180 degrees apart about the axis of the screw.

4. The lead screw actuator device as set forth in claim 1, wherein the plurality of actuators comprises a first actuator, a second actuator, a third actuator, and a fourth actuator with the first bridge supported by the first actuator and the second actuator and the second bridge supported by the third actuator and the fourth actuator.

5. The lead screw actuator device as set forth in claim 4, wherein the first actuator and the second actuator are positioned about 90 degrees apart about the axis of the screw and the third actuator and the fourth actuator are positioned about 90 degrees apart about the axis of the screw.

6. The lead screw actuator device as set forth in claim 1 further comprising:
   a driving circuit coupled to the plurality of actuators, the driving circuit configured to provide one or more driving signals to selectively energize one or more of the plurality of actuators.

7. The lead screw actuator device as set forth in claim 6, wherein the driving circuit is further configured to provide one or more of the driving signals to provide bi-directional movement of the screw.

8. The lead screw actuator device as set forth in claim 1 further comprising:
   an axial load on the tip of the screw that is supported by the nut, the first bridge, the second bridge, and the plurality of actuators; and
   an energy harvesting and storage device coupled to the plurality of actuators, the energy harvesting and storage device configured to transfer charge generated in one or more of the plurality of actuators to a separate energy storage device.

9. The lead screw actuator device as set forth in claim 1 further comprising:

an axial load on the tip of the screw that is supported by the nut, the first bridge, the second bridge, and the plurality of actuators; and a charge measurement device coupled to the plurality of actuators, the charge measurement device configured to measure a change in the axial load on one or more of the plurality of actuators.

10. A method for making a lead screw actuator device, the method comprising:

provideing a base configured to support a plurality of actuators;

providing a first bridge supported by one of the plurality of actuators and a second bridge supported by another one of the plurality of actuators; and rotatably coupling a nut supported by the first bridge and the second bridge to a screw with a sliding contact friction between the screw and the nut, wherein the plurality of actuators generate small movements of the first bridge, the second bridge, and the nut that produces relative rotation between the nut and the screw.

11. The method as set forth in claim 10, wherein each of the plurality of actuators comprise piezoelectric stacks.

12. The method as set forth in claim 10, wherein the first bridge and the second bridge are positioned about 180 degrees apart about the axis of the screw.

13. The method as set forth in claim 10, wherein the plurality of actuators comprises a first actuator, a second actuator, a third actuator and a fourth actuator with the first bridge supported by at least the first actuator and the second actuator and the second bridge supported by the third actuator and the fourth actuator.

14. The method as set forth in claim 13, wherein the first actuator and the second actuator are positioned about 90 degrees apart about the axis of the screw and the third actuator and the fourth actuator are positioned about 90 degrees apart about the axis of the screw.

15. The method as set forth in claim 10 further comprising:

coupling a driving circuit to the plurality of actuators, the driving circuit configured to provide one or more driving signals to selectively energize one or more of the plurality of actuators.

16. The method as set forth in claim 15, wherein the driving circuit is further configured to provide one or more of the driving signals to provide bi-directional movement of the screw.

17. The method as set forth in claim 10 further comprising:

providing an axial load on the tip of the screw that is supported by the nut, the first bridge, the second bridge, and the plurality of actuators; and coupling an energy harvesting and storage device to the plurality of actuators, the energy harvesting and storage device configured to transfer charge generated in one or more of the plurality of actuators to a separate energy storage device.

18. The method as set forth in claim 10 further comprising:

providing an axial load on the tip of the screw that is supported by the nut, the first bridge, the second bridge, and the plurality of actuators; and coupling a charge measurement device to the plurality of actuators, the charge measurement device configured to measure a change in the axial load on one or more of the plurality of actuators.

* * * * *